United States Patent [19]

Oakes

[11] 3,905,391
[45] Sept. 16, 1975

[54] MAGNETIC FLAP VALVE
[75] Inventor: George W. Oakes, South Boston, Va.
[73] Assignee: Irving Melnick, Danville, Va.
[22] Filed: Nov. 19, 1973
[21] Appl. No.: 416,872

[52] U.S. Cl. ............... 137/525.3; 128/278; 251/65; 417/566
[51] Int. Cl.² ......................................... F16K 15/14
[58] Field of Search ...................... 251/65; 128/278; 137/525.3; 417/566

[56] References Cited
UNITED STATES PATENTS

| | | | |
|---|---|---|---|
| 2,867,213 | 1/1959 | Thomas, Jr. .................. | 137/525.3 X |
| 3,774,611 | 11/1973 | Tussey et al. ........................ | 128/278 |
| 3,779,243 | 12/1973 | Tussey et al. ........................ | 128/278 |

*Primary Examiner*—Robert G. Nilson
*Attorney, Agent, or Firm*—Griffin, Branigan and Butler

[57] ABSTRACT

A one-way flap-valve assembly is disclosed wherein a valve seat assembly includes a ferromagnetic cylinder surrounding a valve port, and a valve closure member includes a ferromagnetic portion and a flat resilient membrane portion. The flat resilient membrane portion has a hinge portion which is attached to the valve seat assembly adjacent to the valve port to allow the valve-closure member to rotate between open and closed positions. One of the ferromagnetic portions is permanently magnetized.

In one embodiment, the closure-member ferromagnetic portion is a flat plate which adheres to the top side of the resilient membrane portion. In an embellishment of this embodiment, the flat plate is annularly shaped with a central opening thereof being larger than the valve port.

In a second embodiment, the closure-member ferromagnetic portion is comprised of small magnetic particles embedded or impregnated in the resilient membrane portion.

7 Claims, 4 Drawing Figures 3,905,391

MAGNETIC FLAP VALVE

This application relates generally to valves and more particularly to check valves for allowing one-way fluid flow.

It is common in the prior art to employ check valves, including resilient flap valves, to provide one-way fluid-flow control. However, the reverse-flow cutoff of most check valves is not adequately quick for some situations. For example, for closed surgical evacuator bags as are described in the above mentioned applications, purge valves must allow fluids to be purged from evacuator bags but must prevent virtually all flow of contaminating atmosphere into the bags. In this regard, in order to close sufficiently quickly, closure members of these check valves should remain close to their seats but yet should be capable of allowing relatively large lumps or clots to pass therethrough when necessary. Thus, it is an object of this invention to provide a check valve which has rapid reverse flow closing response but yet which is capable of opening wide when necessary.

Some prior art patents have suggested the use of magnetic attraction to urge check valves toward closed or open positions. For example, see U.S. pat. Nos. 2,669,249 to Wittmann; 3,265,062 to Hesse; 3,417,795 to Hesse; and 3,625,473 to Ignatjev for teachings of such valves. However, these valves are unduly complicated in that they require guides of various types to prevent lateral movement of valve closure members. Some prior-art magnetic valves, such as is described in Hesse (3,265,062) do not provide for a resilient seating of a valve closure member so that there is sometimes leakage in reverse flow directions. Further, in none of these valves is a resilient membrane portion of a valve closure member allowed to be partially sucked into a valve port to provide positive closing on reverse flow. It is another object of this invention to provide a magnetic check valve which is relatively uncomplicated, but which provides accurate and positive closing on reverse flow.

SUMMARY OF THE INVENTION

According to principles of this invention, a magnetic valve is constructed as a flap valve. A resilient membrane is attached to a valve-seat assembly adjacent a valve port for opening and closing in response to fluid flow. A closure-member ferromagnetic portion is attached to the resilient membrane and a valve-seat ferromagnetic cylinder encircles the valve port. One of the ferromagnetic portion and cylinder is permanently magnetized. Magnetic attraction between the ferromagnetic portion and cylinder enhances closing action of the flap valve.

In one embodiment, the closure-member ferromagnetic portion is a metallic plate which is adhered to the upper surface of the resilient membrane. In an embellishment of this embodiment, the plate has an opening therein which is larger than, and coincident with, the valve port.

In a second embodiment, the closure-member ferromagnetic portion comprises ferromagnetic particles embedded in the resilient membrane.

DETAILED DESCRIPTION OF THE DRAWINGS

DESCRIPTION OF THE PREFERRED EMBODIMENT

Figure 1:
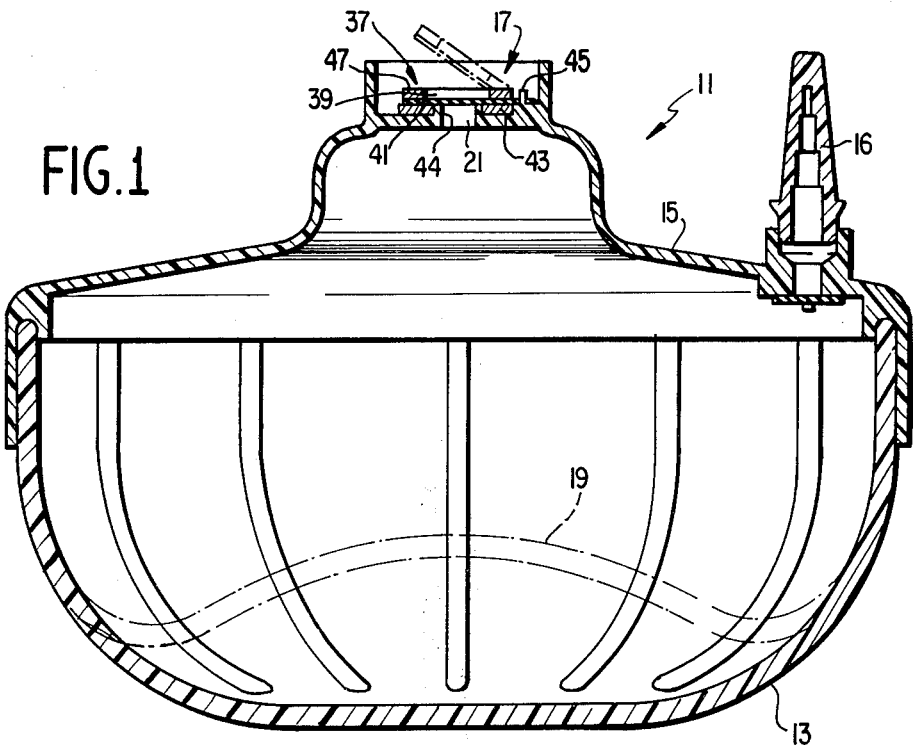
FIG. 1 is a sectional view of a surgical evacuator, including an embellished first-embodiment magnetic purge valve, according to principles of this invention.

FIG. 1 depicts a surgical evacuator 11. The surgical evacuator 11 includes a resilient, circular, cup-shaped portion 13 and a circular rigid portion 15. A purge valve assembly 17 is mounted on the circular rigid portion 15. The construction of the resilient, cup-shaped portion 13 and the circular rigid portion 15 are not a part of this invention and is therefore not described in great detail here. Generally, when the resilient, cup-shaped portion 13 has been depressed to the dashed-line position 19 it seeks to return to the solid line position and thereby creates a negative pressure inside the surgical evacuator 11. This negative pressure sucks fluids from a human body through a tube or tubes attached to inlet plugs 16 into the surgical evacuator 11. When it is desired to empty the surgical evacuator 11, it is inverted and the resilient cup-shaped portion 13 is depressed, thereby creating a positive pressure inside the surgical evacuator 11. This positive pressure opens the purge valve assembly 17, as is described below, and purges fluids through a valve port 21 to outside atmosphere. The purge valve assembly 17 is the main subject matter of this invention and is described in greater detail below. The subject of application Ser. No. 410,240 filed Oct. 26, 1973 is hereby incorporated by reference for additional disclosure of the overall surgical evacuator 11.

Figure 2:
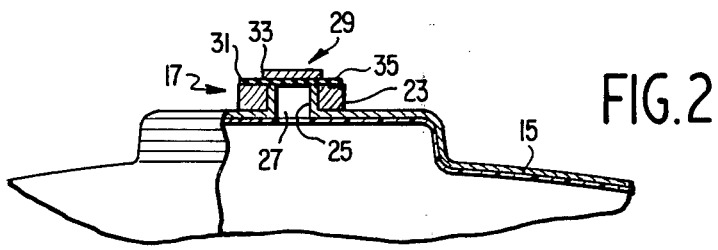
FIG. 2 is a sectional view of a basic first-embodiment magnetic purge valve according to principles of this invention.

FIG. 2 depicts a basic embodiment of the purge valve assembly 17 wherein a ferromagnetic cylinder 23 surrounds an annularly shaped valve seat 25 which is integral with the circular rigid portion 15. The valve seat 25 defines a valve port 27. Flow of fluid through the valve port 27 is controlled by a closure member 29. The closure member 29 comprises a flat resilient membrane 31 and a ferromagnetic plate 33. The resilient membrane, or gasket, 31 is attached over its entire adjacent surface to the ferromagnetic plate 33. Further, the resilient membrane 31 extends laterally beyond the ferromagnetic plate to form a hinge portion 35 at which it is attached to the ferromagnetic cylinder 23. This manner of attachment provides uncomplicated linkage which allows the closure member 29 to rotate away from the valve seat 25 to thereby allow fluid flow through the valve port 27; yet, side slip or side movement between the closure member 29 and the valve seat 25 is prevented by the hinge portion 35.

In operation of the FIG. 2 embodiment, when the resilient, cup-shaped portion 13 of the surgical evacuator 11 is depressed to the dashed line position, fluid flows through the valve port 27. This fluid flow forces the closure member 29, and in particular the resilient membrane 31, slightly off of the valve seat 25. Actual experimentation has shown that the closure member 29 does not rotate an amount which can be readily perceived by the naked eye, but merely lifts from the valve seat 25 a slight amount to allow fluid flow. Magnetic attraction between the ferromagnetic plate 33 and the permanently magnetized ferromagnetic cylinder 23 prevents excessive movement of the closure member 29. Thus, as soon as the resilient, cup-shaped portion 13 is released so that a negative pressure is produced in the surgical evacuator 11, the closure member 29 can move quickly to a position to prevent fluid flow through the valve port 27. It should be noted that a biasing force caused by the hinge portion 35 of the resilient membrane 31 also helps to urge the closure member 29 toward a closed position.

On the other hand, should a large lump or clot pass through the valve port 27, the closure member 29 is capable of opening widely to allow passage. Immediately upon such lump passing, however, magnetic and resilient membrane forces cause the closure member to move once again to a position close to the valve seat 25 if the closure member 29 has not opened too widely. Thus, the closure member 29 is again in a position to rapidly close upon termination of fluid flow. Further, when the closure member 29 is in a closed position, magnetic attraction presses the resilient membrane 31 tightly against the valve seat 25 to prevent leakage between these elements even when no negative pressure exists in the surgical evacuator 11.

Figure 3:
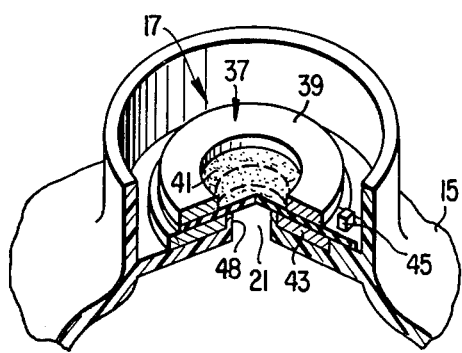
FIG. 3 is an isometric, cutaway view of the magnetic purge valve of FIG. 1.

Turning now to the embodiment of purge valve 17 shown in detail in FIGS. 1 and 3, it includes: a closure member 37 formed of a ferromagnetic-material member 39 and a resilient membrane 41; and a valve seat assembly comprising a ferromagnetic washer 43 and a valve seat 44 integral with the circular rigid portion 15. The resilient membrane 41 is attached to the circular rigid portion 15 by a square peg 45 integral with the circular, rigid portion 15. The ferromagnetic-material member 39 is attached to the upper surface of the resilient membrane 41 along their contacting surfaces. When the closure member 37 is in a closed, solid line position of FIG. 1, the resilient membrane 41 covers the valve port 21. The ferromagnetic-material member 39 is attracted to the ferromagnetic washer 43 to normally maintain the closure member 37 close to the valve seat 45, even when fluids are being evacuated from the surgical evacuator 11 through the valve port 21.

It should be noted that the ferromagnetic-material member 39 has an opening therein which is greater in size than the valve port 21. Thus, the annular area at which the resilient membrane 41 is attached to the ferromagnetic-material member 39 is beyond the periphery of the valve port 21 so that the resilient membrane 41 may be pulled down tightly over a sharp edge 48 of the valve port 21 for accomplishing reliable, airtight, closing of this port upon completion of the purging of fluids through the valve port 21.

In the FIGS. 1 and 3 embodiment, the resilient membrane 41 is constructed of latex rubber and it is glued to the ferromagnetic-material member 39; however, these features are not critical to the invention and it is felt that other equivalents could be used. The ferromagnetic washer 43 is an iron alloy and is coated with cadmium to prevent rust.

The operation of the purge valve assembly 17 of FIGS. 1 and 3 is similar to that described for the FIG. 2 embodiment; however, the FIGS. 1 and 3 embodiment has improved reverse flow cutoff characteristics in that the resilient membrane 41 is sucked into the valve port 21 to provide more positive sealing between the resilient membrane 41 and the valve seat 44.

Figure 4:
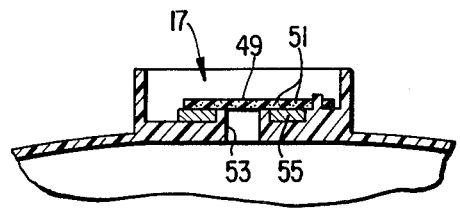
FIG. 4 is a sectional view of a second embodiment of a magnetic purge valve according to principles of this invention.

Turning next to the embodiment of FIG. 4 of the purge valve assembly 17, a purge-valve closure member 49 comprises a resilient membrane that has been impregnated with magnetic particles 51. Thus, the closure member 49 is held tightly against a valve seat 53 by magnetic attraction between the magnetic particles and a ferromagnetic washer 55 which surrounds the valve seat 53. In this case, the closure member 49 is again free to be partially sucked into the valve seat 53 to form a good seal therewith. In the preferred form, the purge-valve closure member 49 comprises a resilient membrane constructed primarily of vinyl with iron magnetic particles embedded therein. The purge valve closure member 49 should be constructed such that only vinyl forms the side surface thereof which contacts the valve seat 53. Such material is sometimes used to form refrigerator gaskets.

Operation of the valve assembly of the FIG. 4 embodiment is similar to that of the valve assemblies described above, for the FIGS. 2 and 1 and 3 embodiments.

It should be understood by those skilled in the art that the magnetic flap valves described herein are relatively uncomplicated to manufacture and install, but yet provide highly reliable and quick reverse-flow cutoff responses. Further, these valves provide these quick responses while also having the capability to pass rather large lumps or clots.

It will be understood by those skilled in the art that various changes in form and detail may be made in this invention without departing from the spirit and scope of the invention.

The embodiments of the invention in which an exclusive property or privilege are claimed are defined as follows:

1. A pressure-actuated one-way flap-valve assembly for allowing fluids to flow in a first direction through a valve port but not in a second direction, said flap-valve assembly comprising:

a valve-seat assembly for defining said valve port surrounded by a valve seat, said valve seat assembly including a ferromagnetic cylinder surrounding said valve port; and a valve-closure member being hingedly attached to said valve-seat assembly adjacent to said valve port so as to be rotatable between a closed position flat against said valve seat and an open position rotated away from said valve seat, said valve closure member comprising a ferromagnetic portion and a flat resilient membrane portion, said ferromagnetic portion and said resilient membrane portion being associated and attached to one another so as to rotate in unison, but with only said resilient membrane portion making contact with said valve seat when said valve closure member is in a closed position, said flat resilient membrane portion having a hinge portion which is attached to said valve seat assembly adjacent to said valve port to allow said valve-closure-member rotation between open and closed positions;

wherein, one of said valve-seat ferromagnetic cylinder and said valve-closure-member ferromagnetic portion is permanently magnetized to cause a magnetic attraction therebetween for urging said flat resilient membrane portion toward said valve seat.

2. A pressure-actuated one-way flap-valve assembly as claimed in claim 1 wherein said ferromagnetic cylinder surrounding said valve port is permanently magnetized.

3. A pressure-acuated one-way flap-valve assembly as claimed in claim 1 wherein said ferromagnetic portion of said valve closure member is permanently magnetized.

4. A pressure-actuated one-way Flap-valve assembly as claimed in claim 1 wherein said ferromagnetic portion of said valve closure member comprises a flat plate which is attached on one side surface thereof to the side surface of said resilient membrane opposite said valve seat.

5. A pressure-actuated one-way flap-valve assembly as claimed in claim 4 wherein said flat plate is attached to said resilient membrane at an attachment area which is annular in shape and which is larger than, but is aligned with said valve port so that an unattached portion of said resilient membrane extends across said valve port.

6. A pressure-actuated one-way flap-valve assembly as claimed in claim 5 wherein there is an opening in said plate which is aligned with said valve port.

7. A pressure-actuated one-way flap-valve assembly as claimed in claim 6 wherein said opening in said plate is larger than said valve port.

* * * * *